United States Patent [19]
Hansen

[11] 3,772,691
[45] Nov. 13, 1973

[54] AUTOMATIC VEHICLE LOCATION SYSTEM

[75] Inventor: George R. Hansen, Arcadia, Calif.

[73] Assignee: The United States of America as represented by the Administrator of the National Aeronautics and Space Administration

[22] Filed: Oct. 5, 1971

[21] Appl. No.: 186,700

[52] U.S. Cl.......... 343/6.5 SS, 343/6.5 R, 343/18 B
[51] Int. Cl............................................... G01s 9/56
[58] Field of Search..................... 343/6.5 SS, 6.5 R, 343/18 B

[56] References Cited
UNITED STATES PATENTS

| | | | |
|---|---|---|---|
| 3,054,100 | 9/1962 | Jones............................. | 343/6.5 SS |
| 3,426,349 | 2/1969 | Gareis............................ | 343/6.5 R |
| 3,384,892 | 5/1968 | Postman......................... | 343/6.5 R |
| 3,362,025 | 1/1968 | Mori.............................. | 343/6.5 SS |

OTHER PUBLICATIONS

Barber, R. J., "21 Ways To Pick Data Off Moving Objects" Control Engineering, Oct. 1963, pp. 82–86.
"Car Identifiers Win RR Group Approval, " Railway Signalling and Communications, Feb. 1962.

Primary Examiner—Benjamin A. Borchelt
Assistant Examiner—G. E. Montone
Attorney—John R. Manning, Monte F. Mott and Paul F. McCaul

[57] ABSTRACT

An automatic vehicle detection system is disclosed, in which each vehicle whose location is to be detected carries active means which interact with passive elements at each location to be identified. In one embodiment the passive means comprise a plurality of passive loops arranged in a sequence along the travel direction. Each of the loops is tuned to a chosen frequency so that the sequence of the frequencies defines the location code. As the vehicle traverses the sequence fo the loops as it passes over each loop, signals only at the frequency of the loop being passed over are coupled from a vehicle transmitter to a vehicle receiver. The frequencies of the received signals in the receiver produce outputs which together represent a code of the traversed location. In another embodiment the code location is defined by a painted pattern which reflects light to a vehicle-carried detector whose output is used to derive the code defined by the pattern.

4 Claims, 9 Drawing Figures

GEORGE R. HANSEN, JR.
*INVENTOR.*

BY
*Lindenberg Freilich & Wasserman*
ATTORNEYS

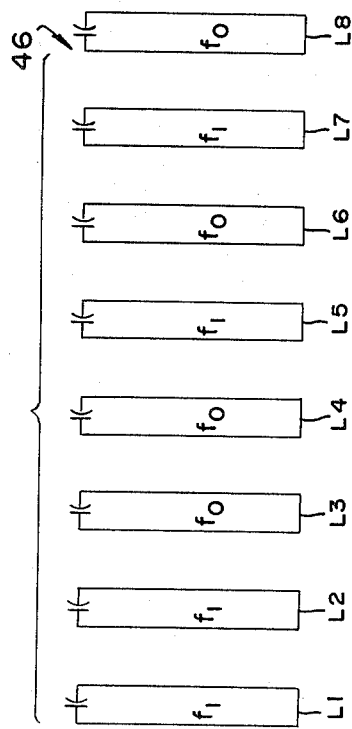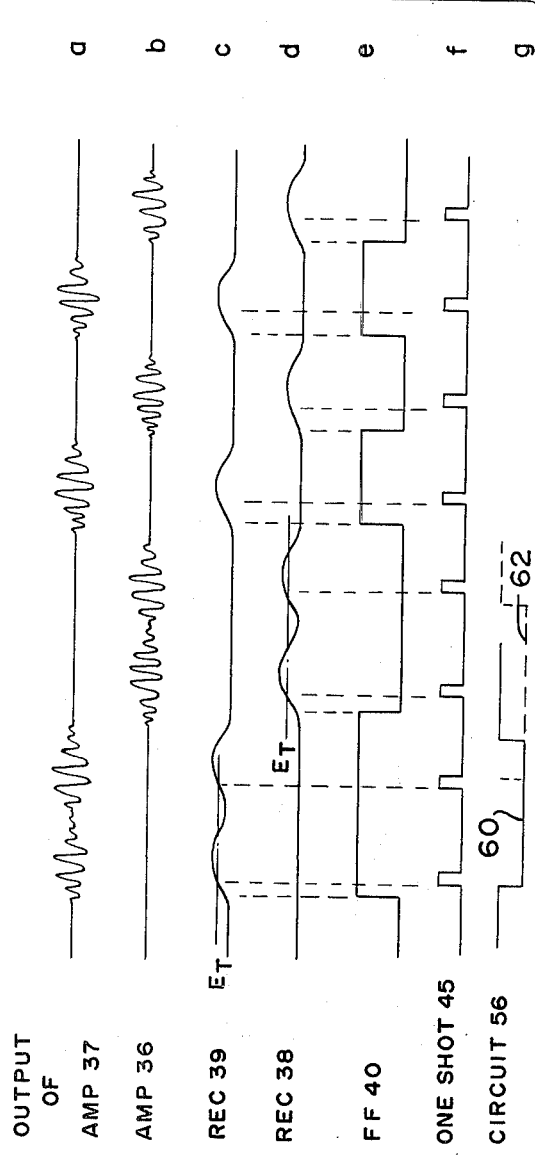

GEORGE R. HANSEN, JR.
    INVENTOR.

BY
Lindenberg Freilich & Wasserman
    ATTORNEYS

3,772,691

AUTOMATIC VEHICLE LOCATION SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention is generally directed to vehicle detection and, more particularly, to an automatic vehicle location system.

2. Description of the Prior Art

There are many applications in which the identification of locations of vehicles is highly desirable. For example, public safety vehicles, such as city police, state police and sheriff's forces, as well as fire fighting equipment can operate more efficiently if the location of the vehicles is known. Such knowledge would allow more efficient dispatching, and frequently more apprehensions or prevention of crime or injury, or loss by fire. The primary impetus is reduction of response time to a call as well as the improvement of efficiency in case of tactical deployment because the closest available vehicle can be utilized. Better administrative control and tactical deployment in disasters is also possible when current data with respect to actual fiducial vehicle location is known.

Taxicabs, material transport vehicle fleets and even U. S. Post Office Department vehicles can also be operated more efficiently with continual knowledge of the location of the vehicles. The vehicle operator is safeguarded in case of emergency need for aid if his location is continually known. Fixed route vehicles such as busses can be scheduled to avoid 'bunching' and to provide better service if the location of the buses is known at all times. The driver of the bus can also be protected in the same manner as drivers of fleet vehicles. One basic reason for such a vehicle location system is that although the vehicle operator almost always may know his location, for various reasons he may not be able to continually inform others of his position.

Several generic techniques for operating automatic vehicle location systems have been extensively explored, and some are even in use. Previous vehicle location or proximity systems in most cases, have relied on some device, usually a radio transmitter or receiver, placed at each geographical location. If the device is a transmitter, it is used to send a relatively unique data signal to passing vehicles. A receiver on the vehicle receives the signal and then relays the data to a central location or control center along with identification of the vehicle. This provides information at the control center as to which vehicles are near what locations. Similarly, receivers at fixed sites pick up identification signals from passing vehicles. This is a system widely used in control of freight train cars. These signals are then relayed to the central location by wire or radio relay, to provide location information at the control center.

The disadvantages of such systems are the continual need for power, the high initial expense, the large communication facility required, and the necessity for continual maintenance and replacement of the active units such as the transmitters or receivers at the various remote locations. Historically, the argument against the use of proximity systems has been the expense of a large number of devices located in the coverage area. If these devices could be installed more economically and then forgotten, and in addition could be shared by many types of service vehicles, much of this argument against the use of proximity systems would be countered. The present invention is directed to a new automatic vehicle location system which eliminates the disadvantages of prior art systems.

OBJECTS AND SUMMARY OF THE INVENTION

It is a primary object of the present invention to provide a new automatic vehicle location system.

Another object of the invention is to provide a new automatic vehicle location system which does not employ active devices such as transmitters or receivers at the locations to be identified.

A further object of the invention is to provide a new automatic vehicle location system which is not encumbered by the expensive maintenance requirements of prior art systems.

Yet a further object of the invention is to provide a new automatic vehicle location system with substantially maintenance-free passive means at each identifiable location.

These and other objects of the invention are achieved by burying passive devices, such as loops or coils in the pavement at geographical sites or locations. Each vehicle whose location is to be determined carries on its underside a transmitter and a receiver. At each location the loops are embedded sequentially in the direction of vehicle travel to represent a unique code which identifies the location. As the vehicle successively passes over the loops, the vehicle receiver is coupled to the vehicle transmitter so that a code, identical with the location-identifying code represented by the loops, is stored in the receiver. Transmission of the location code is effected by the onboard two-way radio of the vehicle to a control center.

The novel features of the invention are set forth with particularity in the appended claims. The invention will best be understood from the following description when read in conjunction with the accompanying drawings.

BRIEF DESCRIPTION OF THE DRAWINGS

FIGS. 3a and 3b are diagrams useful in explaining the operation of the receiver shown in FIG. 2;

FIG. 4 is a pattern diagram for two-way traffic;

DESCRIPTION OF THE PREFERRED EMBODIMENTS

The present invention is based on experiments which indicate that a large electrically tuned loop can provide a means to reliably couple energy from a transmitting coil to a receiving coil where the dimensions of the coils are small compared to the loop. Also, experiments demonstrate that coupling can be effected with adequate signal-to-noise ratio, even when the two coils are in very close proximity to a large magnetic surface, such as the sheet metal floor of a vehicle. When two loops are arranged side by side but tuned to different relatively low frequencies, e.g., 90 and 130kHz, a signal, different in both amplitude and particularly frequency, can be received, depending upon which loop the transmitter and receiver coils are over, provided both frequencies are radiated equally from the transmitter coil.

The basic system of the present invention will first be described in connection with an embodiment in which only two frequencies are employed. However, as will become apparent from the following description, more than two frequencies can be employed to increase the number of identifiable locations for a given total number of loops of the system.

Figure 1:
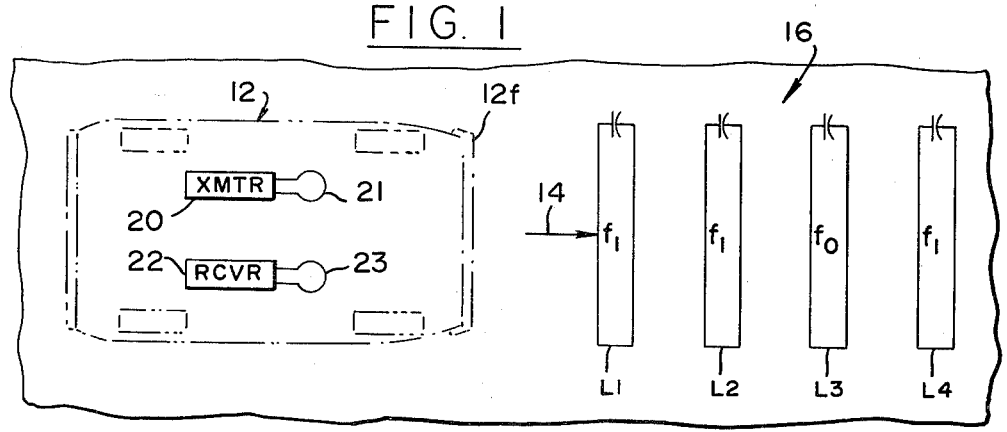
FIG. 1 is a simple diagram useful in explaining one embodiment of the invention.

Attention is now directed to FIG. 1 wherein numeral 12 designates a vehicle traveling in the direction indicated by arrow 14 to a location 16. Thereat, a plurality, e.g., 4, passive loops L1–L4 are buried in the roadway. Loops L1, L2 and L4 are assumed to be tuned to a frequency $f_1$, while loop L3 is tuned to a frequency $f_0$. The vehicle 12 is shown including a transmitter 20 with a transmitting coil 21 which transmits signals at constant amplitude at frequencies $f_0$ and $f_1$. The coil is located underneath the vehicle and on one side thereof. The vehicle also includes a receiver 22 with a receiving coil 23 which is also located underneath the vehicle but on the opposite side, and at the same distance from the vehicle's front 12f as the transmitter coil 21.

It should be appreciated that as the vehicle travels in direction 14, when the coils 21 and 23 are over loop L1, since the latter is tuned to $f_1$, signals transmitted by coil 21 at this frequency are received by receiving coil 23. Similarly, signals at $f_1$ are coupled to the receiver when the coils are over loops L2 and L4. However, when the coils are over loop L3, the coupled signals are those at frequency $f_0$.

The receiver 22 is assumed to include a multistage register which stores in each stage a first binary value, such as a 1, when the frequency of the received signals is $f_1$ and a second binary value, such as a 0, when the received signals' frequency is $f_0$. Thus, in the particular example after passing location 16 the values stored in the register would be 1101. The particular combination of these values represents a code identifying location 16. Clearly, if loops L1–L4 were tuned to frequencies $f_0, f_1, f_0$ and $f_0$, the code stored in the register after passing location 16 would be 0100.

In accordance with the present invention the code stored in the register of each vehicle is interrogated through the two-way vehicle radio by equipment at a control center. Thus the location of each vehicle is identifiable. Clearly with four loops per location, and with two frequencies up to 16 locations can be identified. By increasing the number of loops the number of identifiable locations can be increased. For a two frequency system the total number of loops needed to identify $2^N$ locations is $N \times 2^N$.

Figure 2:
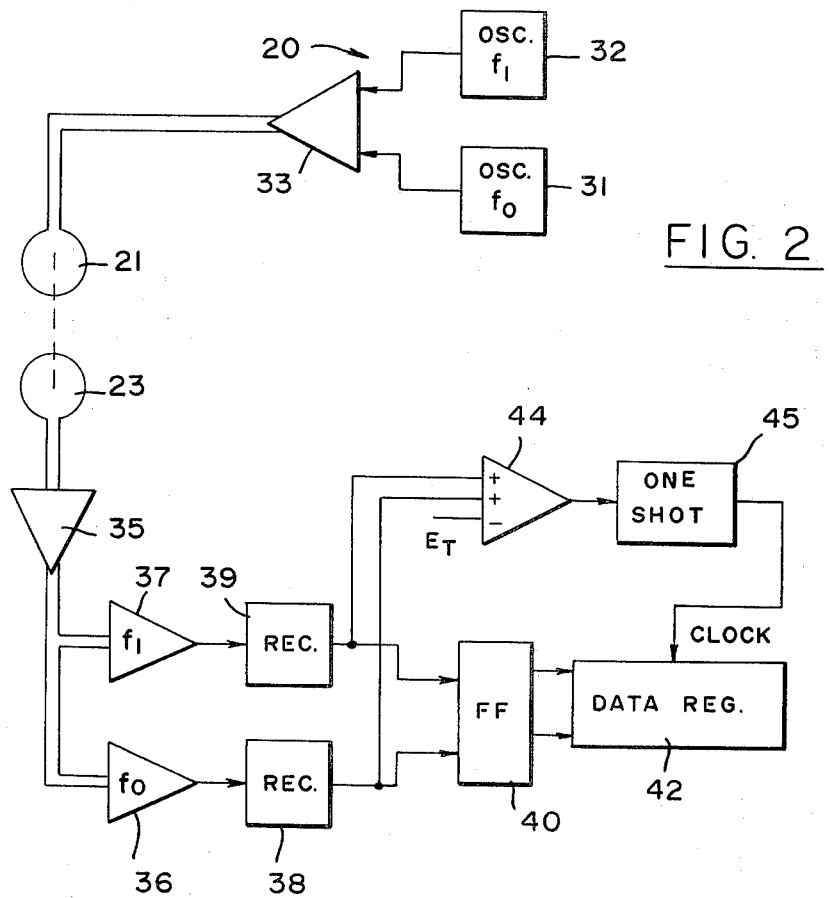
FIG. 2 is a block diagram of a transmitter and a receiver, shown in FIG. 1.

Attention is now directed to FIG. 2 which is a more detailed diagram of the transmitter and the receiver in each vehicle. As shown, the transmitter 20 includes two sine wave C.W. oscillators 31 and 32 which provide signals at frequencies $f_0$ and $f_1$, respectively. These signals are amplified by a power amplifier 33, whose output excites the transmitter coil 21. The signals which are received by receiving coil 23 may be amplified by a preamplifier 35 which is in turn coupled to two tuned amplifiers or digital frequency discriminators, operating at the loop frequencies $f_0$ and $f_1$. In FIG. 2 amplifiers 36 and 37 are assumed to be tuned to $f_0$ and $f_1$, respectively. Their outputs are envelope detected by rectifiers 38 and 39 respectively, whose outputs in turn control the state of a toggle or flip-flop 40. For explanatory purposes it is assumed that when signals at $f_1$ are received and the output of rectifier 39 rises above a reference level, FF40 is set to represent a binary 1 while when signals at $f_0$ are received, the output of rectifier 38 resets the flip-flop to represent a binary 0. The output of FF40 is connected to a data register 42 which stores a 1 or a 0 depending on the state of the flip-flop.

Clock pulses to strobe the binary information into register 42 may be derived from slope or threshold information of the mixed envelope outputs. As shown in FIG. 2, the outputs of rectifiers 38 and 39 are supplied to the plus (+) inputs of a differential amplifier 44 which has its minus (−) input connected to a threshold level, designated $E_T$. Whenever the output of either rectifier exceeds $E_T$ amplifier 44 pulses a one shot 45 which provides a clock pulse to register 42.

The operation of the aforedescribed circuitry is best summarized in connection with FIGS. 3a and 3b. FIG. 3a is a diagram of eight loops L1–L8, assumed to be at a location 46 tuned to the two frequencies as shown, and FIG. 3b is a multiline waveform diagram of the outputs of the various circuits of the receiver.

From the foregoing it is thus seen that in accordance with the present invention roadway location is sensed by burying at each location a sequence of loops, each of which is a simple passive tuned circuit responsive either to frequency $f_1$ or $f_0$. The long dimension of the loop is disposed across the road and the short dimension in the direction of the road or vehicle travel. When the vehicle passes over each loop signals at the loop's tuned frequency from the vehicle's transmitter are coupled by the loop to the vehicle's receiver. The loops at each location are arranged side by side along the direction of travel in a unique binary pattern or code of 1's and 0's where $f_1$ is a 1 and $f_0$ is a 0. As the vehicle passes over each loop, a 1 or a 0 is stored in a register depending on the frequency to which the loop is tuned, so that after passing the entire sequence of the loops at any location, the location's code is stored in the register. This information together with a vehicle identification code, permanently stored in the vehicle, can be interrogated through the vehicle's two-way radio by equipment at a control center to identify the location of each interrogated vehicle. Such location information may then be used for whatever purpose the system is designed to perform. For example, the locations of the various interrogated vehicles may be displayed on a map to provide a pictorial representation of their locations, for monitoring or vehicle routing purposes.

It should be appreciated that for proper operation the transmitting and receiving coils must be over each loop as the vehicle passes over it. Thus the vehicle must traverse the loop pattern in an orthogonal direction. To insure proper loop pattern traversal the loops should be located at a mid-block area, particularly where road lanes are well delineated, rather than at an intersection where turning action may occur. Furthermore, the loops must be traversed in the direction of travel of the particular lane in which they are buried. As shown in FIG. 4, two patterns are required on two-lane roadways, one in each direction of travel. Multiple lanes in each direction require a pattern in each lane.

Among the major advantages of the system, herebefore described, is that the only devices which are needed at fixed sites or locations consist of buried loops. Since the loops are passive, they require no power, and since there is no intrinsic wearout, they do not require maintenance or replacement. The only active devices of the system are in the specially-equipped vehicles and in the control center. Any vehicle maintenance can be accomplished at a central maintenance and service depot. Thus the cost of maintenance is greatly reduced as compared with prior art systems using active devices at many remote locations.

Location accuracy is independent of the coverage area. It is dependent solely on the density of the buried loops and thus can be adjusted to both the user's requirements and to the environment. To achieve one-block location, it is only necessary to provide passive loops somewhere between intersections. Because the location information is in code form, no computation at the control center is required to translate the received data to a specific location. All that is required is a simple look-up operation to relate the received code to a particular location.

As shown in FIG. 2, register 42 is assumed to store the code of the location last traversed by the vehicle. It is this code which is interrogated by the control station to identify the last traversed location. For improved performance and to enable the control station to interrogate the last traversed location, while the vehicle may be at the same time traversing a new location, the system in each vehicle may include a second data register which is the one which is interrogated and register 42 may be used as a temporary buffer. Additional circuits are provided to transfer the contents of buffer register 42 to the second register only when a full location code is loaded in the buffer. Otherwise the buffer register 42 is cleared. Thus, in such an arrangement the code of the last traversed location is in the second register while the buffer register is available to load the code of a subsequent location.

Figure 5:
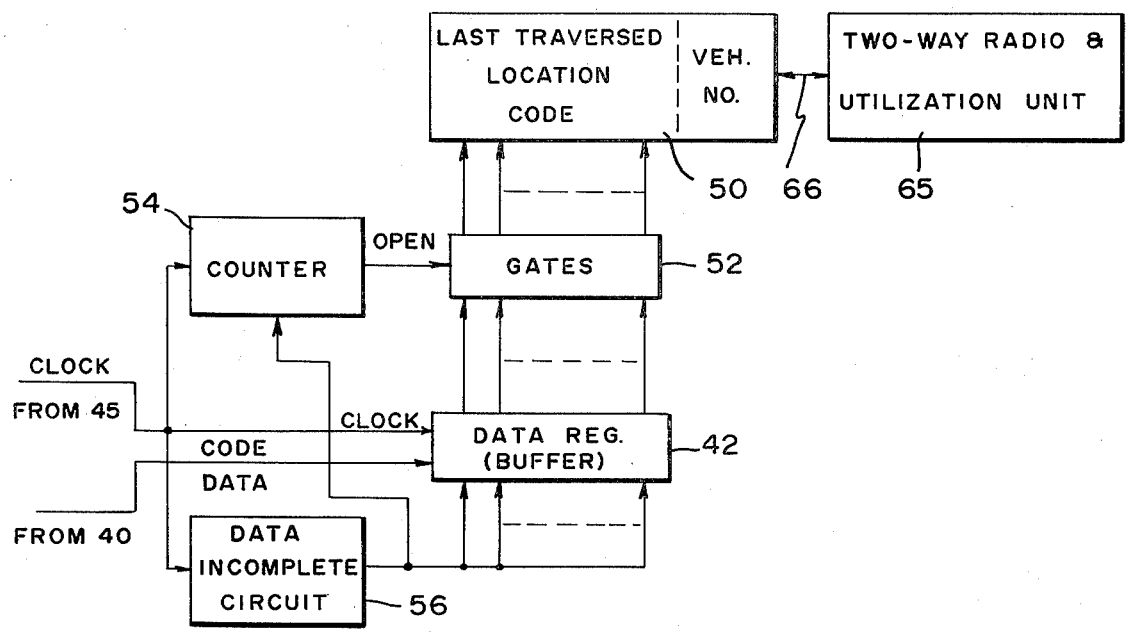
FIG. 5 is a partial block diagram of another embodiment of the invention.

Such an arrangement is shown in FIG. 5. Therein the second register which is designated by numeral 50 is shown connected to register 42 through gates 52. The latter are controlled to open and thereby enable the transfer in parallel of the content of register 42 to register 50 by a counter 54. The counter 54 counts the clock pulses from the one shot 45 (FIG. 2) and opens the gates 52 only when the count therein equals the number of loops per pattern, e.g., 8, in FIG. 3a.

The circuitry in FIG. 5 further includes a data incomplete circuit 56, which responds to each clock pulse from one shot 45 to reset both the register 42 and the counter 54. The function of circuit 56 is to reset the register and the counter either when an incomplete code is loaded into the register or after the location code in register 42 was transferred to register 50. An incomplete code may be transferred either due to spurious clock pulses or if the vehicle does not traverse all the loops in a pattern.

The circuit 56 may assume the form of a one shot to provide in response to each clock pulse a pulse of a duration which is longer than the maximum time required to traverse the distance between adjacent loops, hereafter defined as the bit distance at the slowest expected vehicle speed. The trailing edge of the one-shot pulse is the reset pulse. One such pulse is shown in FIG. 3b, line g and is designated by numeral 60. If a subsequent clock pulse is received by circuit 56, it is retriggered and a new pulse is generated thereby. Such a subsequent pulse is represented by dashed line 62.

From the foregoing it should be appreciated that as long as clock pulses are supplied at a rate so that the duration between clock pulses is not greater than the duration of the pulse from circuit 56, no resetting of registers 42 and 54 takes place. The last clock pulse which is received in a proper sequence again activates circuit 56 as well as counter 54. Thus the transfer of the complete code is transferred to register 50 before the register 42 and the counter 54 are reset. If however less than a full sequence of clock pulses is received, the counter does not enable the gates 52 and then when the trailing edge of the last pulse of circuit 56 occurs, the register 42 and the counter 54 are reset. Thus an incomplete code is prevented from being transferred to register 50 and register 42 and counter 54 are reset to be in condition to receive the next complete code.

In FIG. 5 register 50 is shown including more bits than are needed to store the location code, transferred thereto from register 42. These additional bits may be used for various purposes, such as vehicle number identification. The entire content of register 42 is assumed to be read out on command from the control station via the vehicle's two-way radio into a utilization unit, such as a computer in the control station. Since techniques for reading out the content of the register located at one location upon command from another location are well known, they will not be described herein in any further detail. In FIGS. 5 block 65 represents the two-way radio and the utilization unit, shown connected to register via a two-way line 66.

Figure 6:
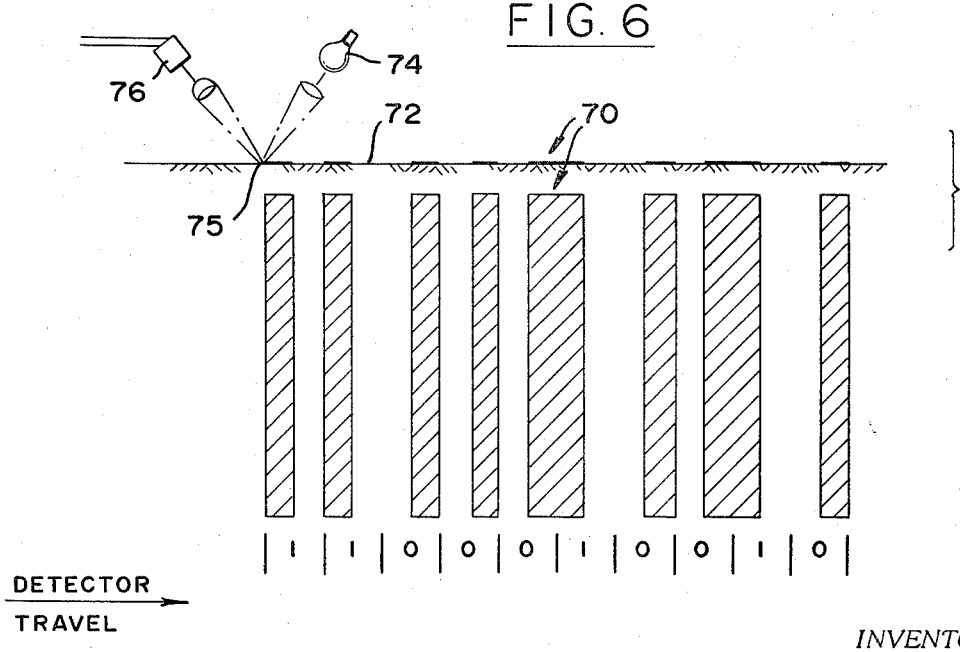
FIGS. 6 and 7 are diagrams useful in explaining another embodiment of the invention.

The basic principles of the invention of using at each location to be identified a plurality of passive elements arranged in a location-code-defining pattern so that when a vehicle passes over the pattern, the location code is stored in the vehicle is not limited to the use of loops, such as herebefore described. An embodiment of the invention in which means other than loops are employed is shown in FIG. 6.

In this embodiment a painted pattern 70 on the road surface 72 is employed to form the code of a particular location. The vehicle is assumed to be equipped with a small light source 74 which is focused to a spot 75 on the road surface. A photo detector 76 is similarly focused on the illuminated spot on the road. As the vehicle traverses the pattern, if the spot is painted with a high reflectance (visible or infrared) paint, a detectable output is produced by detector 76. The light source 74 and detector 75 may be operated in the infrared region and the point may be chosen to reflect in this region of the spectrum.

Figure 7:
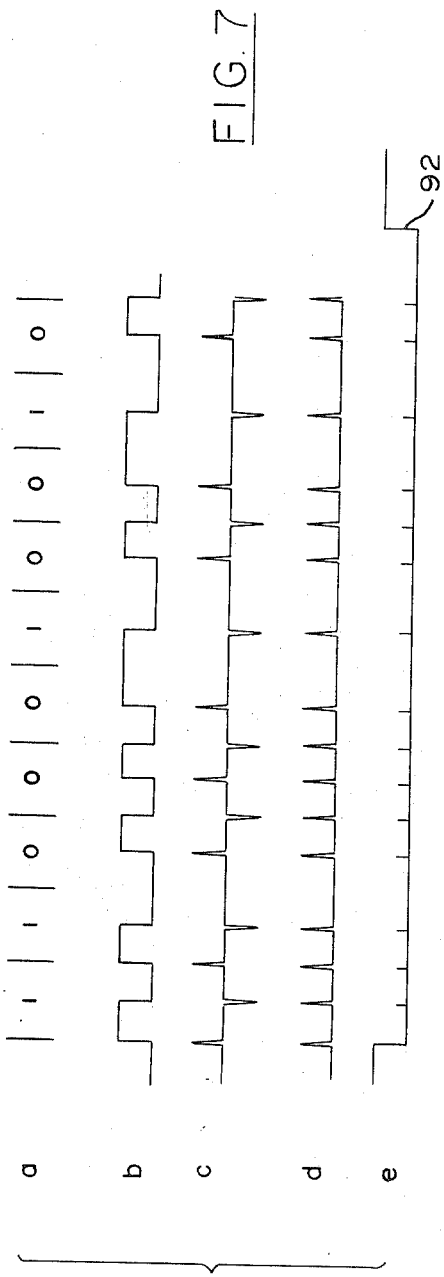

In practice the painted pattern is formed by painted strips spaced by unpainted road strips. The painted strips are represented in FIG. 6 by the cross hatched areas. Each bit of the pattern consists of a painted strip followed by an unpainted strip. A binary 1 is assumed to be represented by a painted strip followed by an unpainted strip so that during the first half of the bit period, the detector output is of one level, e.g., high, and of a second level, e.g., low, during the second half of the bit period. A binary 0 is represented by opposite levels of the detector output during the two halves of the bit period. Such a coding is often referred to as a Manchester code. The detector output for the pattern represented in FIG. 6 is diagrammed in FIG. 7, line $b$ by waveform 78. Line a represents the code 1100010010.

It should be stressed that the painted pattern, applied to the road, must be self-clocking, e.g., the pattern must contain information to distinguish one element from the next so that the sequence of bits (1's or 0's) can be clocked into a register, such as register 42. Such information is present in the Manchester code pattern shown in FIG. 6 and can be extracted by the circuitry shown in FIG. 8. It should be stressed that the circuitry which will be described represents only one arrangement capable of using the output of the detector to determine the code, defined by the pattern 70. Other arrangements may be employed with equal success.

Figure 8:
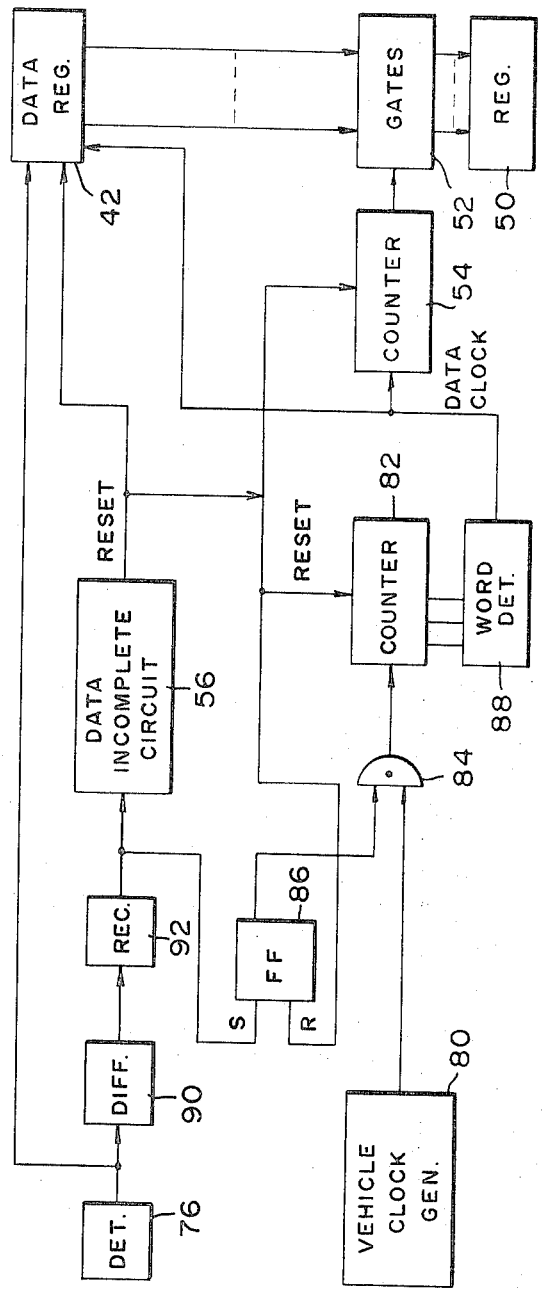
FIG. 8 is a block diagram of the embodiment explained in connection with FIGS. 6 and 7.

As seen in FIG. 8, the circuitry includes a vehicle clock generator 80. The function of generator 80 is to supply a fixed number of pulses, e.g., 1000, during the traversal of one-bit distance irrespective of vehicle speed. The pulse output of generator 80 is supplied to a counter 82 through an AND gate 84 which is enabled only when a control flip-flop 86 is in a set state. The counter 82 has a maximum count, equal to the number of pulses provided by generator 80 per one-bit distance. Thus as the vehicle passes over the pattern, the counter 82 is automatically reset to zero as each bit distance is traversed and a next bit is started to be scanned.

Connected to counter 82 is a word detector 88 which provides a data clock pulse each time the count in counter 82 reaches a preselected value. Since each bit is divided into two strips, the value is chosen to equal one-fourth the maximum count so that the data clock pulse which is supplied to register 42 occurs as the vehicle passes over the middle of the bit's first strip. The word detector output is counted by counter 54 whose operation was herebefore described in connection with FIG. 5. Thus when a count, equal to the number of bits in the pattern (ten for the pattern in FIG. 6), is accumulated in counter 54, the gates 52 are opened to transfer the code from register 42 to register 50.

The output of detector 76 is supplied to the register 42. As each data clockpulse is supplied to the register 42, the level of the detector is clocked into the register. In the particular example each data clock is provided when the vehicle passes over the middle of the first strip of each bit. Thus, for the particular pattern a high level is clocked in for each of the first two bits to represent 1's while a low level is clocked for each of the next three bits to represent 0's.

The circuitry shown in FIG. 8 further includes a differentiator 90 and a rectifier 92. Their respective outputs are diagrammed in lines $c$ and $d$ of FIG. 7. Line $e$ represents the output of circuit 56. The short pulses therein represent the retriggering of circuit 56 by each of the output pulses of the rectifier 92, following the first pulse.

It should be appreciated that the maximum duration or interval between any two pulses out of rectifier 92 is a function of one bit distance and the minimum expected vehicle speed. The data incomplete circuit 56, to which these pulses are supplied, supplies a pulse of a duration which is greater than the maximum duration between any two pulses. As in the previously described embodiment the trailing edge of the pulse from circuit 56 acts as a reset pulse. In the particular embodiment it resets register 42, counter 54, counter 82 and FF86. Since each output pulse of rectifier 92 starts the duration of the pulse of circuit 56 anew, no resetting occurs when a pattern is traversed until a period equal to the period of the pulse of circuit 56 after the last pulse from rectifier 92, as represented by numeral 95 in line $e$ of FIG. 7.

The painted pattern embodiment, shown in FIG. 6 and the circuitry shown in FIG. 8 may best be explained with a specific embodiment. In the painted pattern, the first bit is always a 1 to sense the start of the pattern. Prior to traversing the pattern, register 42, counters 54 and 82 and FF86 are in a reset state, having been previously reset by the trailing edge of the pulse from circuit 56. Also, generator 80 continuously generates pulse, e.g., 1000, per one bit distance travel of the vehicle. However, since AND gate 84 is disabled, i.e., closed, no pulses are counted by counter 82.

As the vehicle passes over the painted strip of the first bit and rectifier 92 provides the first pulse, FF86 is set, opening gate 84 so that counter 82 begins to count the pulses from generator 80. Also the first pulse from rectifier 92 triggers circuit 56. The word detector 88 has a maximum count of a 1000 and the word detector 88 provides a data clock pulse at a count of 1000/4=250, i.e., at the center of the painted strip or after one quarter of the first bit was traversed. Since at this point the painted strip is being scanned, a high level, representing a binary 1, is clocked into register 42 and counter 54 is incremented by one.

At the end of scanning the first bit the count in counter 82 reaches the maximum value of 1000 and it resets automatically. When the leading edge of the painted strip of the next 1 bit is sensed, a new pulse is supplied by the rectifier 92. It retriggers circuit 56 and attempts to set FF86 which is already set. Gate 84 is open enabling counter 82 to count the pulses from generator 80. When the count in counter 82 reaches 250, i.e., the vehicle has scanned one quarter of the next bit, a second data clock pulse is provided by detector 88 and register 42 clocks the high level of detector 76.

Again at the end of the scanning of the second bit, counter 82 resets automatically and when the count reaches 250, detector 88 provides the data clock so that register 42 clocks the low level of the detector 76 which is present at one fourth the 0bit, since the first half of this bit is the unpainted strip. This clocking process continues until the pattern has been fully scanned. Counter 54, having received the required number of data clock pulses, opens gates 52 to enable the transfer of the code now present in register 42 to register 50.

It should be stressed that the last pulse from rectifier 92 retriggers circuit 56. Since no subsequent pulse appears during the duration of the pulse of circuit 56, the latter is not retriggered again. Therefore its trailing edge appears, resetting register 42, counters 54 and 82 and FF86. Such resetting is needed for normal operation as well as to prevent the system from being affected by one or more spurious pulses.

Either embodiment, herebefore described, produces a binary location code. Only such a code is possible with the painted pattern since each code bit consists of painted and unpainted strips, where their order defines the bit value. However, in the embodiment where passive tuned loops are used, a binary code is derived when only two frequencies are employed. Thus one frequency represents a binary 1 and the other frequency a binary 0. If desired, more than two frequencies may be used in which case other than a binary code may be generated. The use of more than two frequencies may complicate the coding, its storage and subsequent transmission to the control station. However, R frequencies would result in a reduction in the total number of required loops. The total number of loops for Z locations where $Z=R^N$ is $N \cdot R^N$.

There has accordingly been shown and described herein two different embodiments of a system for producing location codes in vehicles as the vehicles pass over and scan passive elements positioned at various locations. At each location a plurality of these passive elements are embedded, such as in or on the road, in a pattern which defines the location code. As the vehicle passes over these elements in the proper direction of travel, the elements interact with circuitry in the vehicle which results in the storage of the location code in the vehicle. This code is transferable by appropriate means to a control station. Because the last vehicle location is in coded form, no computation at the control station is required to translate the received code to a specific location. All that is needed is a simple look-up operation to relate the received code to a specific location.

The embodiment with buried loops is substantially maintenance free once the loops are buried and tested, although the initial system cost is greater than the cost of implementing the embodiment with the painted patterns. The latter embodiment will require proper maintenance of the patterns, such as occasional repainting. As previously indicated, paint which is reflective in the infrared range may preferably be used to distinguish the pattern painted strips from other road markings. Also, such paints may be indistinguishable from the road surface color thereby reducing the likelihood of intentional tampering with the patterns. Since the elements at each location are passive, the system is capable of providing location information to a multiplicity of users or services on a noninterfering or independent basis.

Although specific embodiments of the invention have been described and illustrated herein, it is recognized that modifications and variations may readily occur to those skilled in the art and consequently it is intended that the claims be interpreted to cover such modifications and equivalents.

What is claimed is:

1. A system for providing in a vehicle a code indicative of a location last traversed by said vehicle comprising:

transmitter means in said vehicle including a transmitting loop for simultaneously transmitting unmodulated signals at N different frequencies, where N is not less than two;

receiver means in said vehicle and including a receiving loop for receiving unmodulated signals at any one of said N different frequencies, said transmitting and receiving loops being aligned in a direction perpendicular to the vehicle's travel direction;

a plurality of individual passive elements spaced apart from one another and located sequentially in the direction of travel of said vehicle at each location, each passive element being tuned only to a selected one of said N frequencies, whereby as said vehicle passes over the passive element and the transmitting and receiving loops are over the passive element signals which are transmitted by said transmitting loop at the frequency corresponding to the frequency to which the element being passed over is tuned are directly coupled to and received by said receiving loop of said receiver means; and code means in said vehicle coupled to said receiver means for providing a code indicative of the location last traversed as a function of the frequencies of the signals which have been received successively by said receiver means after the vehicle passed over all of said passive elements at said location.

2. The system as described in claim 1 wherein $N=2$, the two frequencies being definable as $f_o$ and $f_1$, and each passive element is tunable to either $f_o$ or $f_1$ whereby when the transmitting and receiving loops are over a passive element tuned to $f_o$, only the $f_o$ signals are directly coupled from said transmitting loop to said receiving loop, and when both the transmitting loop and receiving loop are over a passive element tuned to $f_1$ only the $f_1$ signals transmitted by said transmitting loop are directly coupled to said receiving loop, and said code means include a bistable element which is driven to a first state when the $f_o$ signals are received and to a second state when the $f_1$ signals are received, and a multistage register means coupled to said bistable element for storing a first binary value when $f_o$ signals are received and said bistable element is driven to said first state and for storing a second binary value when $f_1$ signals are received and said bistable element is driven to its second state, whereby the binary values in said register means represent the code indicative of the location last traversed by said vehicle.

3. The system as described in claim 2 wherein each of said passive elements is a loop tuned to either $f_o$ or $f_1$ having a dimension in a direction perpendicular to the vehicle's direction of travel which is at least as great as the distance between said transmitting and receiving loops.

4. The system as described in claim 1 wherein each of said passive element is a loop having a dimension in a direction perpendicular to the vehicle's direction of travel which is related to the distance between said transmitting and receiving loops.

* * * * *